Oct. 20, 1959  D. F. PETERSON ET AL  2,909,684
INFINITELY ADJUSTABLE SPEED POWER DRIVE UNITS
Filed Jan. 7, 1957  9 Sheets-Sheet 1
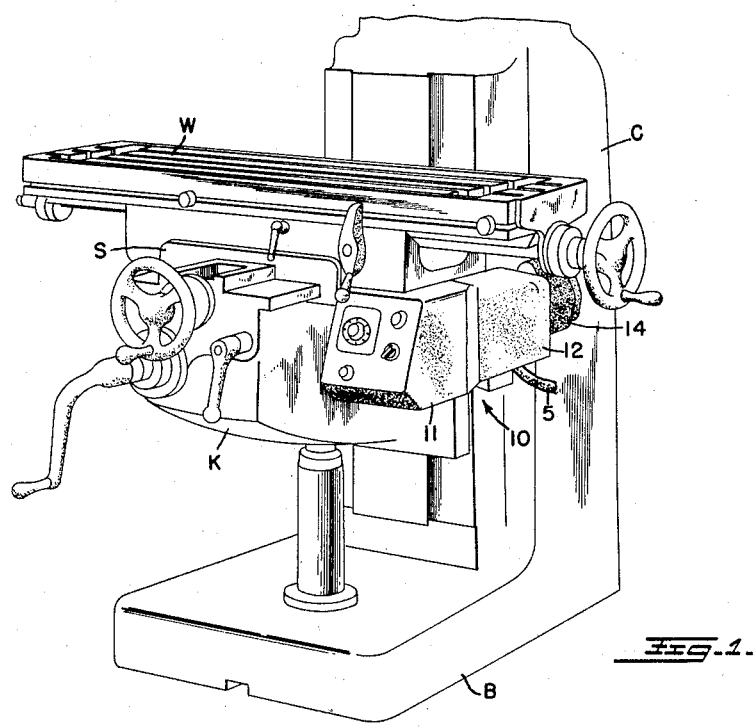
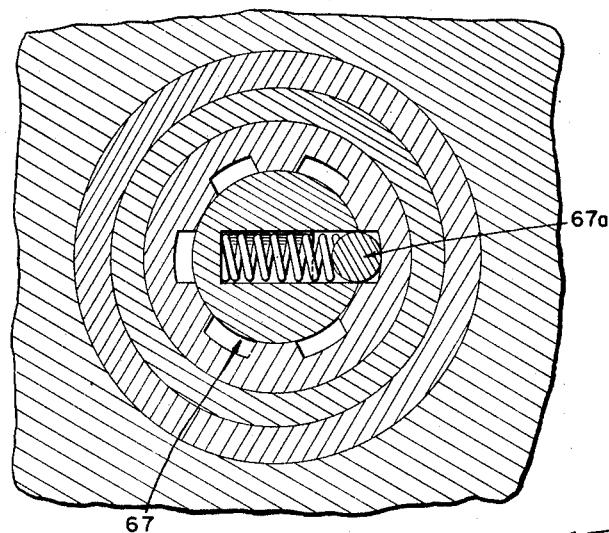
INVENTORS.
Donovan F. Peterson
Alvin C. Welch
BY Peck + Peck
ATTORNEYS

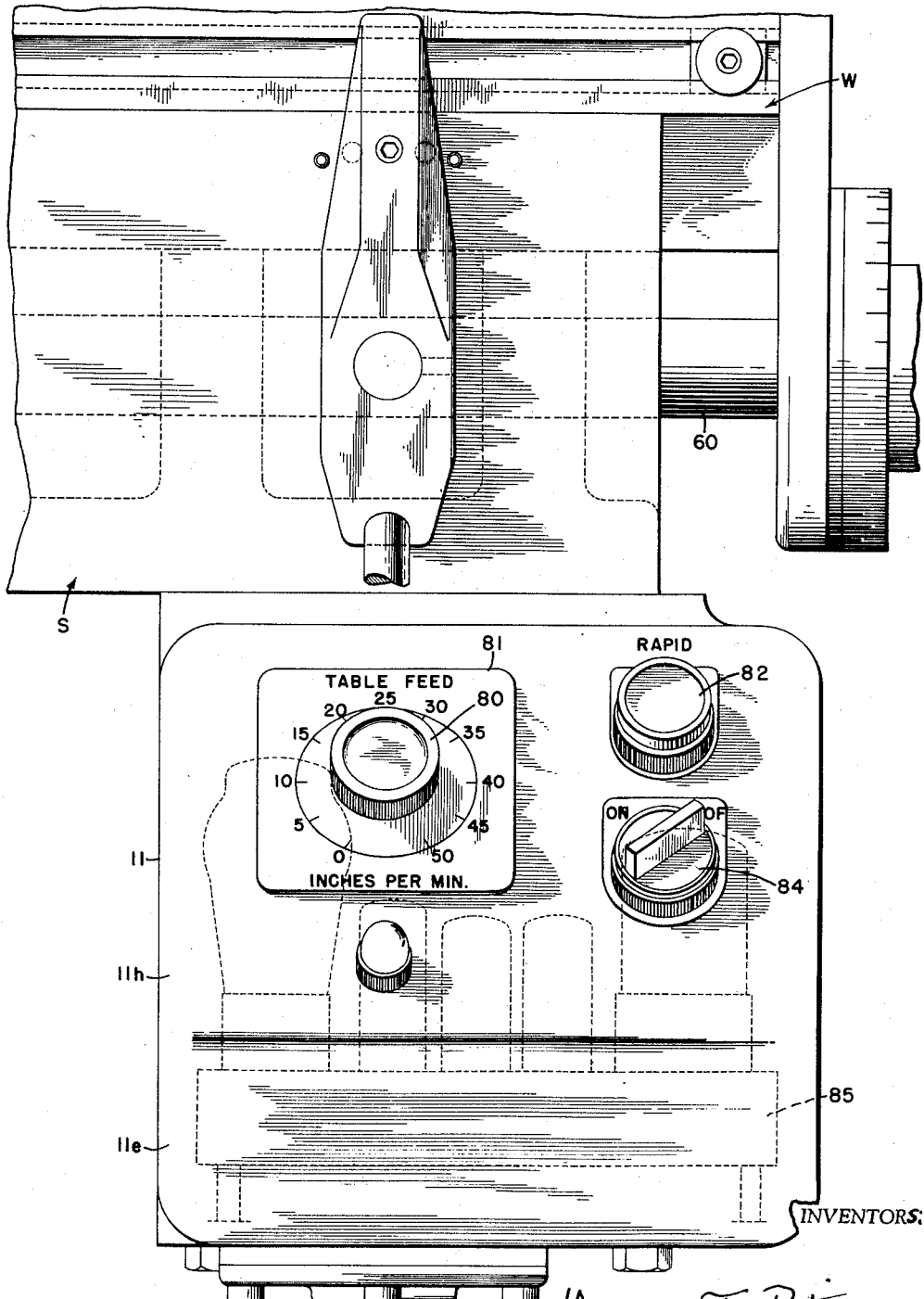

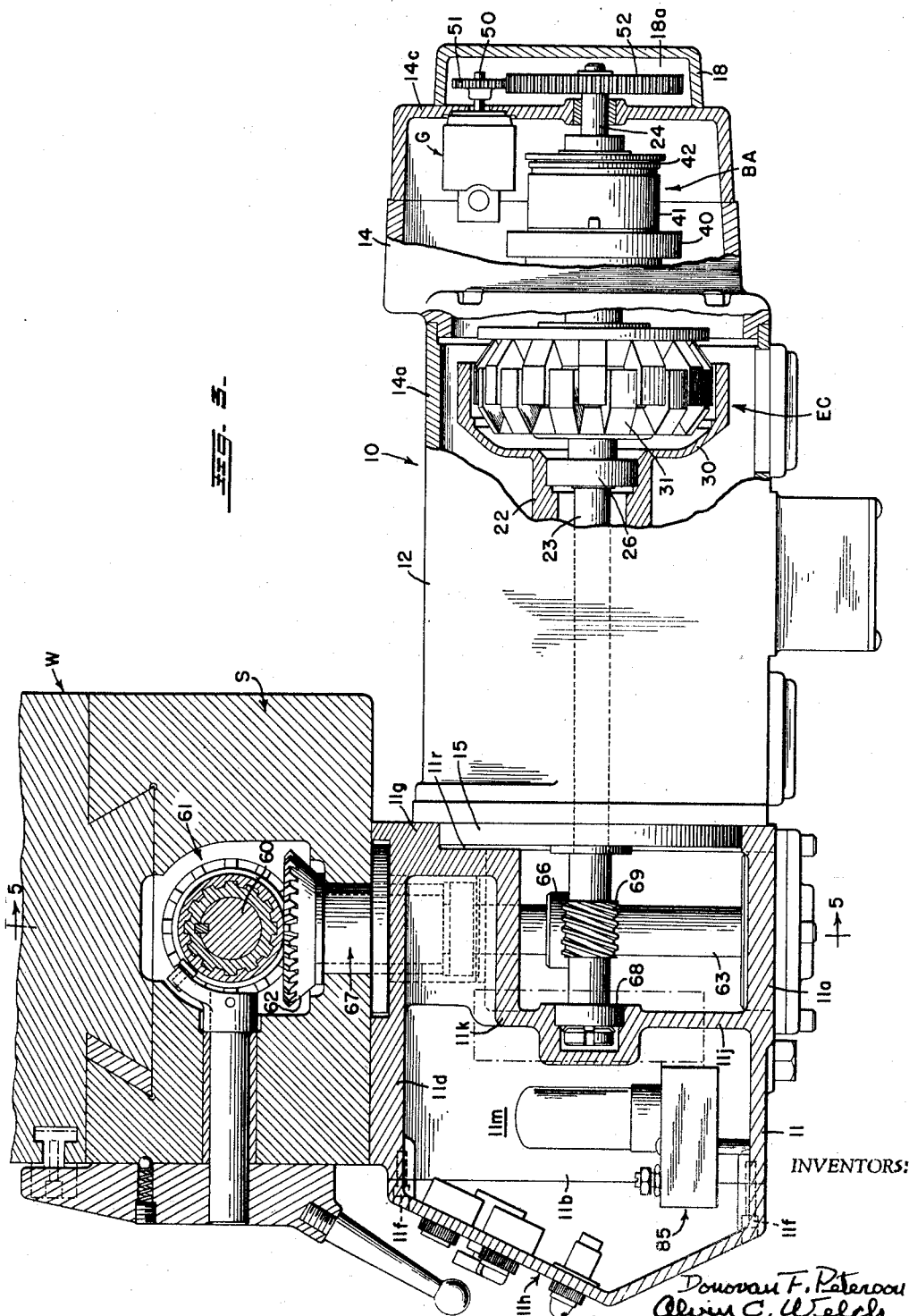

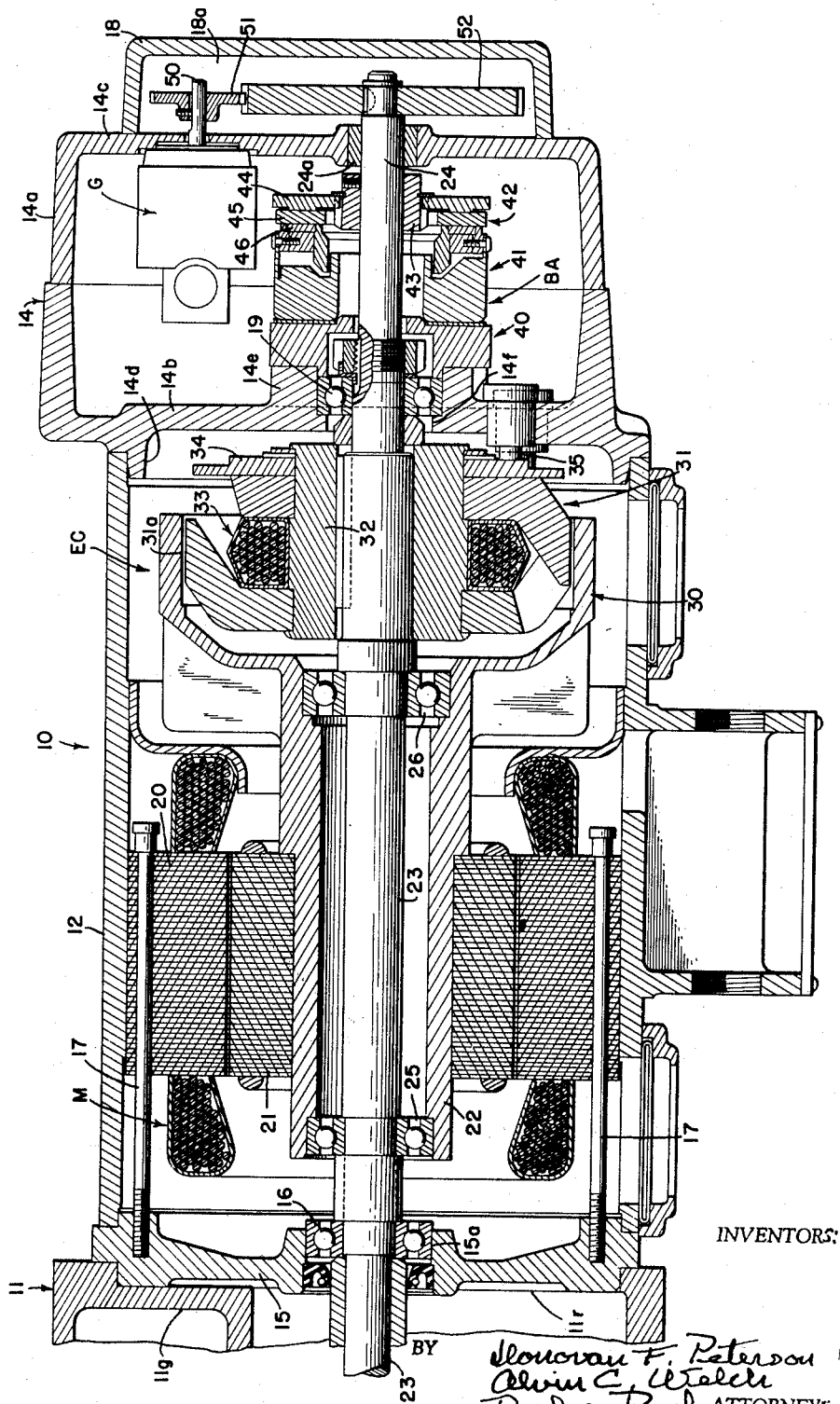

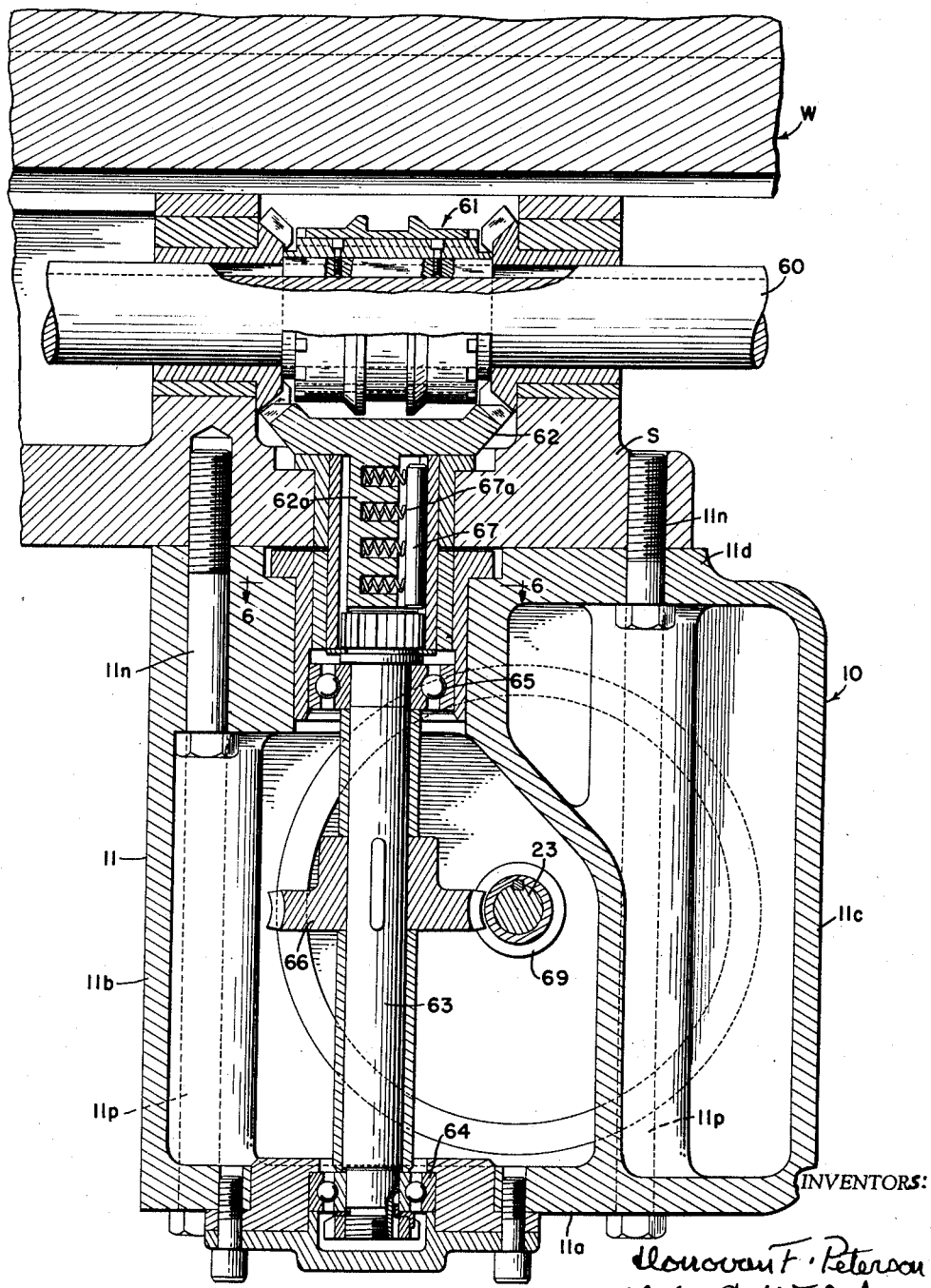

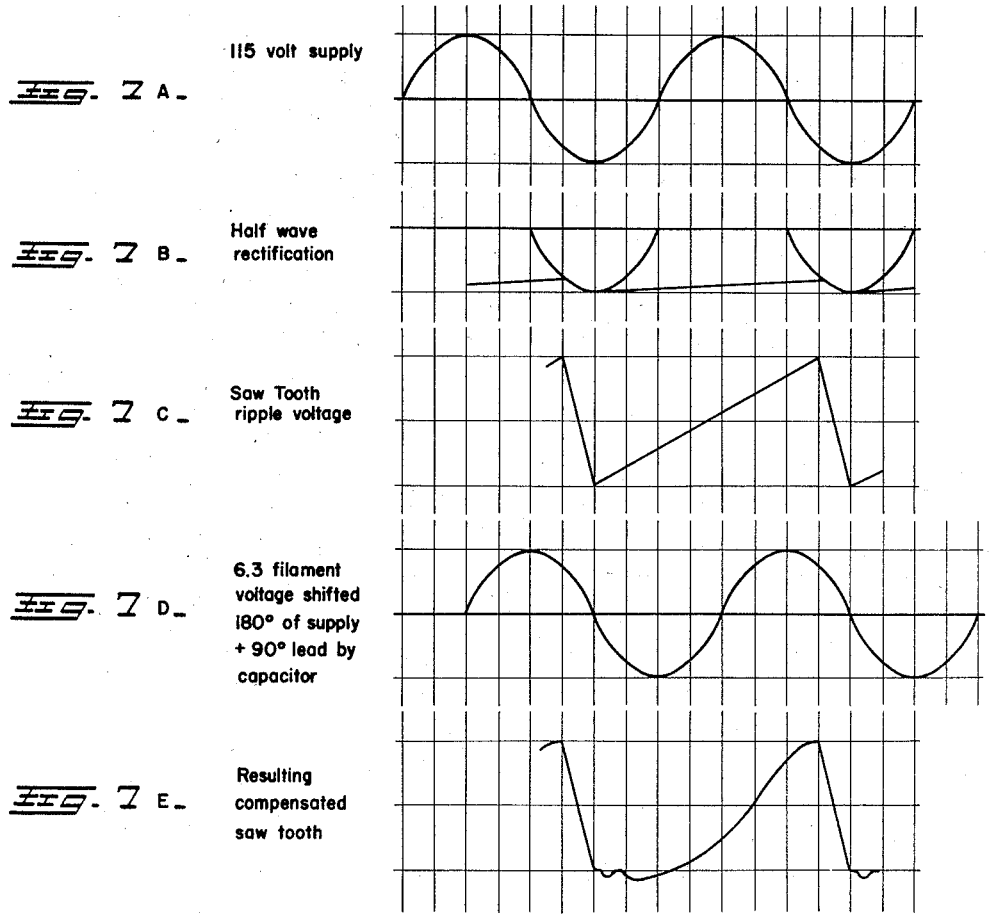

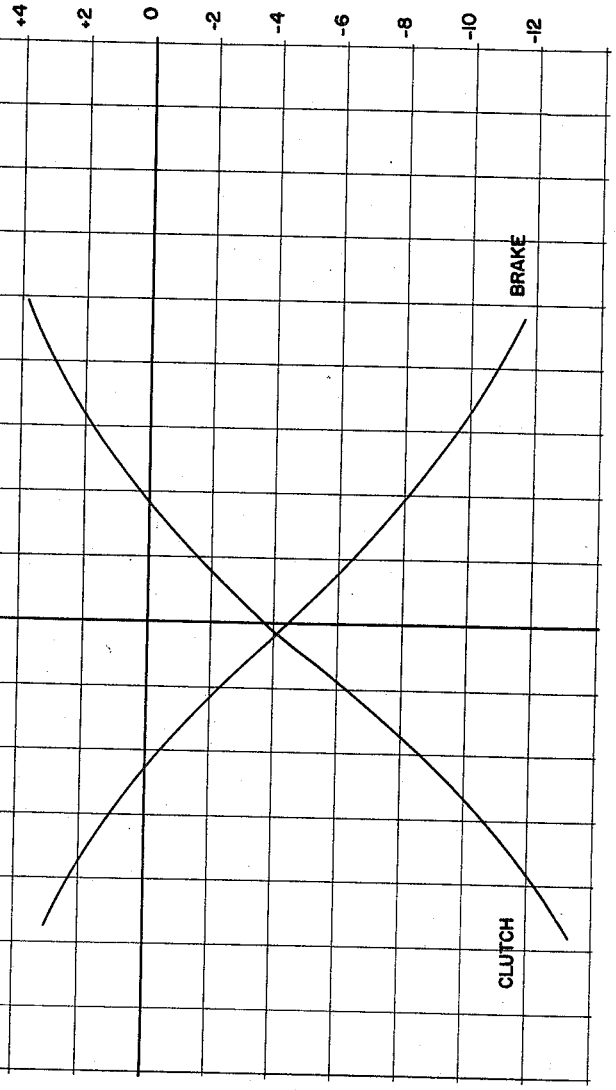

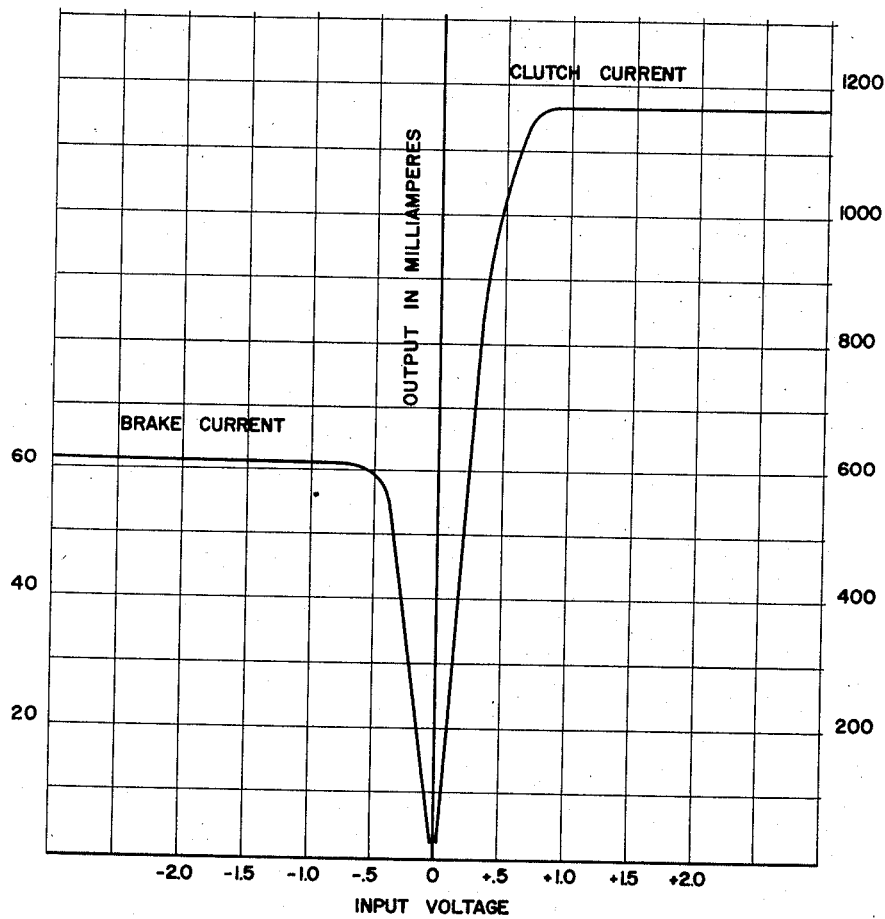

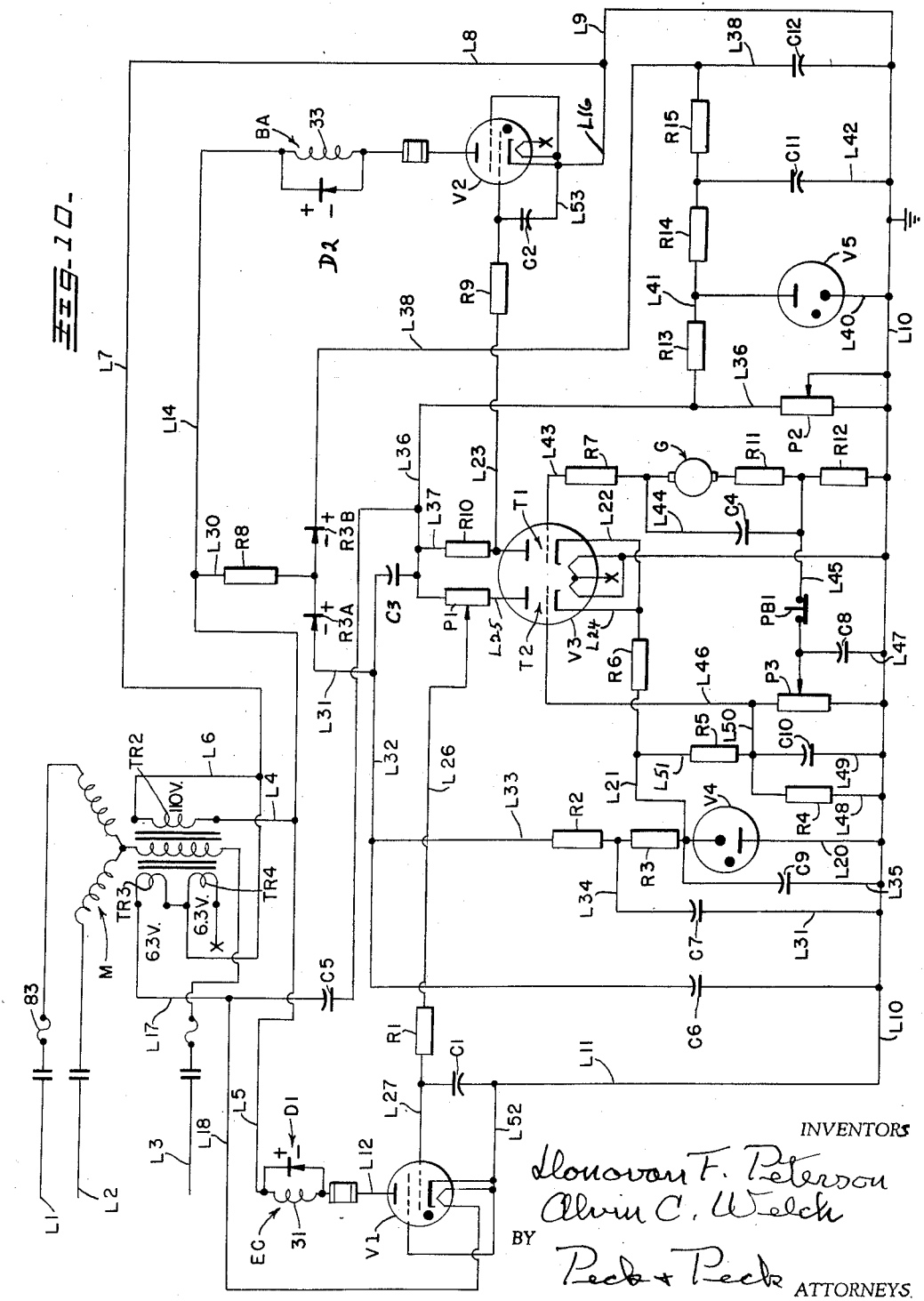

United States Patent Office 2,909,684
Patented Oct. 20, 1959

2,909,684

INFINITELY ADJUSTABLE SPEED POWER DRIVE UNITS

Donovan F. Peterson, Fort Atkinson, and Alvin C. Welch, Racine, Wis., assignors to George Gorton Machine Co., a corporation of Wisconsin Application January 7, 1957, Serial No. 632,808

12 Claims. (Cl. 310—96)

Our present invention relates to infinitely adjustable speed power drives of the types powered by an electric motor; and the nature and objects of the invention will be readily recognized and understood by those skilled in the art to which the invention relates in the light of the following explanation and detailed description of the accompanying drawings illustrating what we now believe to be one preferred embodiment and structural and electrical expressions of one form and adaptation of a drive of the invention, from among various other forms, expressions, constructions, combinations and modifications, and from other adaptations thereof for other power drive purposes, of which the invention is capable within the broad spirit and scope thereof as defined by the claims hereto appended.

One of the primary objects of the invention is to provide an improved adjustable, infinitely variable speed power drive unit in which any preset speed for which the drive is adjusted is automatically maintained with a high degree of precision under varying operating and load conditions.

Another object is to provide an efficient power drive unit which is adjustable to infinitely vary the speed of the power output or drive component of the unit to any preset speed within the range of infinite speed adjustment, and further which may be smoothly and safely adjusted to vary the rate of speed at which the drive component is being driven to any other desired rate of speed during operation of the unit.

Another object is to provide such a power drive unit in which any preset speed for which the unit is adjusted will be maintained automatically under varying operating and load conditions, and which unit will be extremely sensitive and of fast response to instantly correct and compensate for operating and load conditions acting to increase or decrease the speed of the power output or driving component from the preset speed for which the unit has been adjusted.

Another object is to provide such an adjustable power drive unit in which the driving motor thereof is of the constant speed type and drives an infinitely variable speed power output or drive component at any selected and preset rate of speed below the rate of speed of the constant speed driving motor.

A further object is to provide such an adjustable speed, power drive unit in which a constant speed motor drives an infinitely variable speed power output or drive component through an infinitely variable torque coupling or clutch component and a brake component which are automatically selectively operated by varying operating and load conditions to maintain the power output component at the selected and preset rate of speed.

Another object is to provide such an adjustable speed, power drive unit in which the infinitely variable torque coupling between the motor and the power output or driving component of the unit is of the eddy current type and the brake component is of the electro magnetic type with such variable torque coupling and electromagnetic brake component being automatically selectively coordinated, controlled and operated by an electronic servo control system of extreme sensitivity and high speed of response operating under the monitoring control of the speed of operation of the power output or drive component as determined by the operating and load conditions encountered by that component.

A further object is to provide such an adjustable speed power drive unit in which the electronic servo control system is monitored or controlled by a reference or error voltage developed by a tachometer generator driven from the power output component to generate voltages proportional to the rate of speed of the latter component under existing operating and load conditions.

A further object is to provide such an adjustable speed, power drive unit as a self-contained, compact and readily mounted and installed unit assembly which is totally enclosed or encased.

Another object is to provide such a power drive unit as a self-contained, compact assembly with the electronic servo control system therefor in the form of a readily removable and replaceable "package" unit mounted and enclosed at the forward end of the power drive unit with the manual controls for the adjustment and operating control of the unit being mounted in readily visible and easily accessible locations at the exterior of the forward end of the drive unit assembly.

Another object is to provide an improved electronic servo control system for such a unit in which a minimum number of electronic control tubes and other electrical components are required, with resulting low cost of production and assembly of the system.

Another object is to provide such an electronic servo control system which is of extreme sensitivity and high speed of response to the monitoring or reference voltages applied thereto for speed correction to maintain the selected preset speed of the unit under the varying operating and load conditions encountered by the drive in operation thereof.

Another object is to provide an electric servo control system for the selective and coordinated control of an eddy current clutch and an electric brake which system will be of high efficiency having high speed and precision of response in the controlling functioning thereof.

Another object is to provide an improved electronic servo control system for selectively controlling electrical components in accordance with the rate of speed of an operating component by a reference voltage proportional to the speed of the operating component in which the reference voltages are amplified and supplied to separate control tubes for firing the latter selectively in response to variations in the rate of speed of the operating component above or below a predetermined speed of the latter component and which system provides a null condition of balance in which the control tubes are inactive to control the electrical components when the operating component is at the predetermined speed.

And a further object is to provide an improved electronic control system utilizing thyratron control tubes in which an improved linear firing control of the tubes by a reference or monitoring voltage is effected with resulting increase in efficiency and a higher degree of precision in the control of such tubes.

Referring to the accompanying drawings in which similar reference characters refer to corresponding parts throughout the several figures thereof.

Fig. 1 is a perspective view of an adjustable drive or power feed unit of our invention mounted on the saddle of a knee, saddle and worktable assembly of a milling machine, with the drive unit in operative connection with the worktable for power feeding of the latter.

Fig. 2 is an enlarged view in front elevation of the drive unit in the form of the invention of Fig. 1 in mounted position on the saddle, showing the manual controls for the drive but with a portion only of the saddle of the machine of Fig. 1 being shown.

Fig. 3 is an outer side view of the drive unit in the mounted position of Fig. 1 with the forward portion of the unit being shown in vertical longitudinal section and with portions of the casing being broken away to show the eddy current clutch, electric brake, tachometer generator and its drive in elevation.

Fig. 4 is a vertical longitudinal section through the motor, clutch, brake and tachometer generator assembly of the drive unit of Fig. 3.

Fig. 5 is a vertical longitudinal section taken as on the line 5—5 of Fig. 3.

Fig. 6 is a transverse horizontal section taken as on the line 6—6 of Fig. 5.

Figs. 7A, 7B, 7C, 7D and 7E are graphs showing the various wave forms developed by the electronic servo control system of the drive of the invention to obtain the compensated saw tooth wave form for controlling the firing of the thyratrons of the system.

Fig. 8 is a graph showing the clutch controlling thyratron and the brake controlling thyratron characteristics, respectively.

Fig. 9 is a graph showing the clutch and brake thyratron current response characteristics in the electronic servo control system of the invention.

Fig. 10 is a diagrammatic view showing the electronic servo control system and circuit network thereof connected with the constant speed driving motor and the eddy current clutch and electric brake of an infinitely variable speed drive unit of the invention.

Basically an infinitely adjustable power drive or feed unit of the invention includes a constant speed motor driving a power output component such as a drive spindle through a variable torque coupling such as an eddy current type of clutch for developing the torque required to prevent under speed and to maintain the drive spindle at a preset rate of speed, with an electric brake for preventing increase of speed beyond the preset speed by braking the drive spindle down to the preset speed. The variable torque coupling or eddy current clutch and the electric brake are automatically selectively controlled in their operations to maintain the speed of the power output component or drive spindle driven from the constant speed motor, at a selected preset speed under operating load conditions by an electronic servo control system which is monitored or controlled automatically by a tachometer generator driven from the power output component or drive spindle to develop a reference, monitoring, or error control voltage for the system which is proportional to the rate of speed at which the tachometer generator is driven from the drive spindle. The electronic servo control system is infinitely adjustable through the speed range of a particular power drive unit of the invention and can be set to effect automatic operation and maintenance of the power output component or drive spindle at the selected and preset rate of speed under the varying operating and load conditions to which the drive unit may be subjected in operation and use. In the functioning automatically of an electronic servo control system embodying our invention, when the drive spindle tends toward under speed, the reference voltage then generated by the tachometer generator will effect control operation of the system to increase the excitation of the eddy current clutch and thus increase the torque developed thereby to that torque required to maintain the drive spindle at the preset speed and prevent under speed under the then existing operating and load conditions. If, however, the drive spindle increases its rate of speed over the selected and preset rate, the reference voltage then generated by the tachometer generator driven from the drive spindle will instantly and automatically cause functioning of the electronic servo system to excite and effect braking operation of the electric brake to the degree or magnitude necessary to retard the rate of speed of the drive spindle to bring it down to the preset rate of speed under the then existing operating and load conditions. Instantly the drive spindle is thus brought up to the preset speed or down to the preset speed by the eddy clutch or the electric brake, the tachometer generator then again generates the required reference voltage for the null condition of the system for the operation of the drive spindle at the preset speed to which the servo control sytem of the unit has been adjusted.

An embodiment of an infinitely adjustable speed, power drive unit of the invention, has been selected as an example form thereof designed for incorporation in a machine tool, such as a milling machine, to power feed the worktable of such a machine at any selected and preset rate of linear feed for the worktable within the speed range of the unit. This example embodiment has been selected for purposes of explaining the principles and functioning of a drive unit of the invention and the various structural, mechanical and assembly features because the conditions encountered in the power feed of a machine tool worktable at a constant and selected preset rate serve to demonstrate the precision and efficiency obtainable by a drive of the invention in overcoming even small variations of operating load conditions tending to reduce or to increase the rate of feed from a selected preset feed rate. The selected example of the infinitely adjustable speed, power drive unit of the invention is illustrated in Fig. 1 of the accompanying drawings as operatively incorporated in a machine tool, such as a milling machine, of the type having a knee, saddle and worktable assembly of generally conventional arrangement, in which the knee K is vertically bodily adjustable on the base B of the machine at the forward side of the column C with the saddle S being slidably mounted on the knee for straight-line movement thereon independently thereof, and the worktable W being slidably mounted on the saddle S for straight-line movements transversely across and independently of the saddle. In the present adaptation of an adjustable power drive or feed unit of the invention as a power feed for the worktable of a machine tool as shown in Fig. 1 of the drawings, the drive unit is identified generally by the reference character 10, and is disclosed as mounted in fixed position on and movable bodily as a unit with the saddle S.

In this instance the example drive unit 10 is mounted in rigid fixed position to the under side of the overhang of the saddle S at the right-hand side thereof when facing the machine of Fig. 1, and is generally longitudinally disposed substantially parallel with the straight-line path of movements of the saddle S. The drive unit 10 is a completely enclosed and self-contained unit and includes a main housing or casing made up of the forward section 11, the intermediate section 12, and the rear section 14. The forward section 11 of the main housing of the unit is of generally rectangular, box-like form comprised of a bottom wall 11a, generally parallel opposite side walls 11b and 11c, a top wall 11d, a front wall 11e which is removably mounted by the machine screws 11f, and a rear wall 11g, as will be clear by reference to Figs. 3 and 5 of the drawings. The front wall 11e of housing section 11 is formed to provide the downwardly and outwardly sloping control panel 11h extending across the upper side thereof and on which the manual controls for the selective operation of the drive unit are mounted, as will be fully explained hereinafter. The box-like housing 11 also includes a vertical partition wall 11j which joins with a horizontal partition wall 11k, the partition walls 11j and 11k forming the housing section 11 into a forward compartment 11m thereacross for receiving, mounting and completely enclosing the electronic servo control system assembly in the form of a removable "package" unit, as will be later referred to and explained. The power drive unit 10 in the selected example form thereof, herein disclosed, is mounted in position at the under side of the saddle S by securing the top wall 11d of the housing section 11 thereof to the saddle S by the machine screws 11n and the threaded bolts 11p, as clearly shown by Figs. 3 and 5 of the drawings.

The section 12 of the main casing or housing of the drive unit 12 is of tubular form of generally cylindrical section with the forward end thereof rigidly fixed to a generally circular motor mounting base and spindle bearing holder 15 which is itself suitably secured and attached to the rear wall 11g of housing section 11 at the rear side thereof (see Fig. 4). The rear wall 11g of housing section 11 is provided with an enlarged opening 11r over which the motor mounting base 15 is positioned. The mounting base 15 is provided with an axial bore 15a therethrough in which there is mounted the anti-friction bearing assembly 16 for journaling therein and therethrough the power output shaft or drive spindle of the unit.

The constant speed, electric motor M of the drive unit 10 is mounted in the casing section 12 in fixed position therein by the threaded bolts 17 received in suitable tapped bores in the mounting base 15, as shown in Fig. 4. The eddy clutch unit EC is also mounted in the casing section 12 between the rear end thereof and the assembly of the motor M. The rear section 14 of the main housing or casing of the unit 10 is suitably rigidly mounted and secured on and to the rear end of casing section 12 and extends rearwardly therefrom in general axial continuation thereof. This rear section 14, referring now to Figs. 3 and 4 of the drawings, includes the side wall 14a therearound with the front or inner wall 14b thereacross and the rear wall 14c generally parallel with front wall 14b and extending across and closing the rear side of section 14. The section 14 is secured in rigid fixed position to the rear end of casing section 12 by means of a flange 14d which extends into section 12 and suitable securing means such as machine screws, bolts or the like (not shown). The front wall 14b of housing section 14 is provided with a rearwardly extending annular boss or seating flange 14e thereon with a bore 14f extending through wall 14b and such boss or flange. The bore 14f is in axial alignment with the bore 15a in the mounting base 15 at the forward end of housing section 12. An antifriction bearing assembly 19 is mounted in bore 14f in axial alignment with the bearing assembly 16 in the motor mounting base 15 at the forward end of housing section 12. The electric brake unit BA is mounted and enclosed within housing section 14 between the front wall 14b and the rear wall 14c thereof, with the stator or fixed component of the brake unit mounted on boss or seating flange 14e, as will be hereinafter described. Also mounted on the rear wall 14c of housing section 14 and enclosed therewithin is the tachometer generator G for generating the reference or error voltage for controlling the automatic functioning of the electronic servo control system to maintain the power output component or drive spindle of the drive unit 10 at the selected preset speed.

The main housing or casing assembly for containing and enclosing the mechanisms, including the electronic servo control system, of a drive unit 10 of this example, is completed by an auxiliary housing or casing 18 fixed to the rear wall 14c of housing section 14 in position over and across the outer side of such rear wall. The auxiliary housing 18 provides a chamber 18a therewithin at the rear side of wall 14c for housing and enclosing the transmission from the power output component or drive spindle of the unit 10 to the tachometer generator G, as will be hereinafter described.

*The constant speed motor, eddy clutch and electric brake combination*

The electric motor M of this example drive unit is a ½-horsepower constant speed, alternating current induction motor of the squirrel cage type familiar in the art and includes the stator or field 20 within which the armature 21 is mounted for rotation relative thereto in the usual manner. The armature 21 is mounted in fixed position on and includes the tubular rotor 22 extending axially therethrough for rotation therewith as a unit assembly. The constant speed motor M drives through the coupling means or magnetic eddy clutch EC, the power output component or drive spindle 23. This drive spindle 23 extends through the casing sections 12, 14 and 18 and axially through the tubular rotor 22 of the motor M, as will be clear by reference to Fig. 4 of the drawings. The drive spindle 23 extends at its opposite ends through and is journaled and supported in the antifriction bearing assemblies 16 and 19 with the drive spindle providing a tail section 24 which extends rearwardly through casing section 14 from the bearing assembly 19 to and through a bearing bushing 24a mounted in the rear wall 14c of housing section 14. The armature 21 and its rotor 22 are mounted and supported and journaled on the drive spindle 23 by the spaced antifriction bearing assemblies 25 and 26 located at the opposite ends of the tubular rotor 22 and mounted between that rotor and the drive spindle. Thus the motor armature 21 and its rotor 22 are rotatable as a unit on and independently of the power output shaft or drive spindle 23 with the latter being rotatable independently of the rotor in the spaced spindle bearing assemblies 16 and 19.

The clutch unit EC is of the so-called eddy current type familiar in the art and includes the circular coupling drum member 30 which in this example is formed integral and coaxial with the rotor 22 and extends rearwardly therefrom surrounding and concentric with the drive spindle 23. Thus the coupling drum 30 of the eddy clutch EC is continuously rotated by and with the rotor 22 of motor M as a unit assembly when the motor is in operation and such rotation is, of course, at a constant speed. The eddy current clutch EC is completed by the field assembly 31 which is mounted on and keyed to the drive spindle 23 in a position thereon located substantially within the coupling drum 30 but separated from the coupling drum 30 by a relatively small annular air space or gap 31a. The clutch field assembly 31 includes in this example a hub member 32 keyed to the drive spindle 23 with the field windings 33 for exciting the clutch being electrically connected through a slip ring 34 and brushes 35 mounted in the wall 14b of the housing section 14. This eddy current clutch EC is of the direct current type and is supplied with direct current by a suitable rectifier D1 (see Fig. 10), as will be hereinafter explained in connection with the description of the electronic servo control system of the unit. As this eddy current type of clutch EC is well understood in the art, it is considered unnecessary to present a detailed structural or functional description thereof herein. Suffice it to state that when the field 31 of the clutch unit EC is deenergized with the motor M in operation, then the rotor 22 of the motor and the coupling drum 30 of the clutch unit EC will be rotated at the constant speed of the motor M, but the field assembly 31 of the clutch unit and the drive spindle 23 driven thereby will remain stationary and inactive. However, when the field 31 of the clutch unit EC is energized and excited by supplying a voltage thereto, then as the coupling drum 30 rotates relative to the poles of the field, eddy currents are generated in the drum and form a pattern of magnetic poles on the inner surface of the drum so that magnetic attraction between the poles of the field and those generated in the coupling drum cause the development of a torque, whereupon the field assembly 31 will follow and be rotated with the coupling drum to rotate the power output or drive spindle 23 to which the field assembly is keyed. As will be later explained in the functioning of the electronic servo control system and the controlled operation of the drive unit, the magnitude of the torque developed by the clutch unit EC and applied to the drive spindle 23 is dependent upon the voltage supplied to the field 31 of the clutch unit and the resulting degree of excitation and strength of the magnetic coupling formed between the field and the coupling drum 30. In other words, the torque delivered to the drive spindle 23 and resulting rate of rotation of that spindle is determined by the slippage between the coupling drum 30 driven at constant speed by the motor M and the field assembly 31 on and which drives the drive spindle.

The brake unit BA for the drive spindle 23 is of an electromagnetic, friction type also familiar in the art so that a detailed description thereof herein is not considered necessary. This brake unit BA is mounted within the casing section 14 and includes a fixed assembly 40 including the field 41, which is mounted and secured in rigid position on the mounting boss 14e at the inner side of wall 14b of the casing section 14c with the drive spindle 23 extending therethrough for rotation freely relative thereto, as will be clear by reference to Fig. 4 of the drawings. This brake unit BA is of the direct current type and the field 41 of the assembly 40 is supplied with a direct current voltage from a rectifier D2 (see Fig. 10), as will be hereinafter explained in connection with the description of the electronic servo control system of the unit. The armature assembly 42 of the brake unit is mounted on and rotated in fixed relation with the tail shaft or section 24 of the drive spindle 23. This armature assembly 42 includes a hub member 43 suitably fixed on the drive spindle tail section 24 to the rear of but immediately adjacent to the field assembly 40 and field 41 thereof. This armature assembly 42 includes the armature 44 which mounts and carries on its inner side facing the fixed field assembly an annular removable braking face assembly 45 for friction engagement on and against an annular braking surface 46 provided on and around the rear side of the field 41. The armature assembly 42 with its braking face or surface 45 is, as will be understood by those familiar with this type of electric brake, movable or displaceable axially relative to the drive spindle 23 and the field assembly 40 to and from position with the braking face 45 of the armature assembly in friction braking engagement with the braking face 46 of the field assembly 40. When no voltage is being supplied to the field 41 of the brake unit BA and the field is deenergized, the armature assembly is inactive and is rotated by and with the drive spindle 23 out of braking engagement with the field assembly 40. When the field assembly is energized, then the magnetic forces generated thereby will draw and move the armature assembly into active braking position with the fixed braking surface 46 of the field in braking engagement with the rotating braking surface 45 of the armature assembly 42 on the drive spindle 23.

*The reference voltage tachometer generator*

In accordance with our invention, as will be fully explained hereinafter, the control of the functioning of the electronic servo control system of the infinitely adjustable speed drive unit of the example hereof, is automatically carried out by applying a monitoring, reference, or error voltage to the clutch unit and brake unit control tubes of the servo control system of a magnitude proportional to the rate of speed at which the power output component or drive shaft of the drive unit is operating. This reference voltage is generated by a D.C. tachometer generator G driven directly from the drive spindle 23 of the example unit 10 hereof, which delivers a D.C. reference voltage which is proportional to the rate of speed of operation of the tachometer generator. In the self-contained and completely enclosed power drive unit 10 of the example form hereof which is adapted as the power feed drive for the worktable of a machine tool, as exemplified by Fig. 1, the D.C. tachometer generator G is mounted and enclosed within the rear section 14 of the main housing or casing of the unit. In this instance this tachometer generator G has a driving shaft 50 and the generator is mounted in fixed position on the rear wall 14c of and within housing section 14 to one side of the electric friction brake unit BA with the driving shaft 50 of the generator G parallel with the tail section 24 of the drive spindle 23 and with the driving shaft 50 extending rearwardly through wall 14c into the compartment 18a formed by the auxiliary housing 18. A pinion gear 51 is fixed on the generator driving shaft 50 and a spur gear 52 is keyed onto the rear end of drive shaft tail section 24 in driving mesh with the pinion 51. Thus the tachometer generator G is driven from the drive shaft 23 through the gear train provided by the gear 52 and the pinion 51. In this instance the tachometer generator G is of a type to generate a D.C. voltage of 0.8 volt per 100 r.p.m. of the generator driving shaft 50, although it is to be understood that such voltage output for the tachometer generator is not critical but is utilized herein to meet the particular requirements of the example drive unit 10 and its electronic servo control system. It follows, therefore, that throughout the range of operation of the example drive unit 10, the D.C. reference or monitoring voltage generated by the tachometer generator G will be proportional to the rate of speed of rotation of the drive spindle 23, so that any deviation in rate of speed up or down by the drive spindle 23 from the preset rate of speed will cause the generator G to supply a monitoring or reference voltage, that is, a voltage different from that required for the preset speed condition. This monitoring or reference voltage will then cause selective functioning of the electronic control system to restore and maintain the drive spindle at the preset speed for which the drive unit 10 has been adjusted.

In this particular example adaptation of drive unit with its ½ H.P. constant speed motor, the gear ratio provided by the gear train comprised of the gear 52 and pinion 51, is 3:1, that is, the rate of speed of the tachometer generator G is increased three (3) times over the rate of speed of rotation of the drive spindle 23. It follows, for example, that for each 100 r.p.m. of the drive spindle 23 the tachometer generator G will be driven at 300 r.p.m. and generate a voltage output of 2.4 volts and so for each rate of speed of the drive spindle 23 the tachometer generator will be driven thereby at three times the drive spindle rate. As will be hereinafter pointed out in the explanation of the electronic servo control system of a drive of the invention, the reference, monitoring or error voltage as generated at the tachometer generator is then amplified with a gain of approximately ten (10) times the voltage at the generator and such amplified voltage is then utilized for the error signal to which the system responds for correcting action.

*Power transmission from drive unit to worktable*

The machine of Fig. 1 in which the example drive unit 10 of the invention is incorporated, includes the usual feed mechanism for the worktable W. The example power drive unit 10 is operatively connected in driving relation with such feed mechanism in order to provide the automatically controlled and infinitely adjustable power feed for the worktable W. Referring to Figs. 3 and 5 of the accompanying drawings, the feed mechanism for the worktable W includes the usual feed screw 60 mounted and journaled in the usual manner on the saddle S and including a selective bevel gear type of reversing mechanism identified generally by the reference character 61. A driving bevel gear 62 is journaled in vertically disposed position in the saddle S in operative mesh with the bevel gear reversing mechanism 61. This bevel driving gear 62 is driven by a vertical shaft 63 which is located in and which extends upwardly through the forward housing section 11 of the drive unit 10, being journaled at its lower end in an antifriction bearing assembly 64 and at its upper end in an antifriction bearing assembly 65 supported in or from the partition wall 11k of housing section 11. A worm gear 66 is splined or otherwise fixed to shaft 63 for driving such shaft. The shaft 63 is positioned in axial alignment with the depending shaft 62a of the driving bevel gear 62 and an automatic clutch assembly identified generally by the reference character 67 forms an operative coupling between the upper end of the shaft 63 and the bevel gear shaft 62a. This automatic clutch assembly 67 includes the spring loaded clutch pins 67a in normal clutching engagement between shaft 63 and the shaft 62a of bevel gear 62 but yieldingly declutching and disengaging the bevel gear 62 from driven relation with the shaft 63 automatically when an overload is applied to this transmission. Upon removal of an overload the clutch assembly 67, through its spring loaded pins 67a, automatically restores to its clutching position establishing positive driving connection between shaft 63 and the bevel gear 62.

The drive spindle 23 extends from its forward bearing assembly 16 through and across housing section 11 to the partition wall 11j where the end of the shaft is mounted and received in an antifriction bearing assembly 68. The bevel gear 66 is positioned on the shaft 63 so that it lies within the plane passing through the axis of drive spindle 23. A worm 69 is fixed on drive spindle 23 in driving mesh with the worm gear 66. Thus the power output component or drive spindle 23, through worm 69 and worm gear 66, drives the shaft 63 and through the automatic clutch assembly 67 and bevel gear 62 drives the worktable feed screw 60 through the reversing gear mechanism 61 to power feed the worktable W along its linear path of movement in the direction selected and dictated by the reversing mechanism 61. Such linear feed of the worktable W on the saddle S of the example adaptation of a drive unit 10 of the invention will be at a feed rate proportional to the rate of speed of the drive spindle 23 and the worktable will have a feed rate for each rate of speed of the drive spindle. As the speed of the drive spindle is infinitely variable, it follows that the worktable W will have an infinitely variable feed rate, usually calibrated in inches per minute, over the speed range of the drive spindle 23 of the drive unit 10.

With a power drive unit of the invention such as the example drive unit 10 hereof, the power output component or drive spindle 23 has a speed range from zero to the maximum or constant rate of speed of operation of the motor M depending upon the degree of slippage or, conversely, the magnitude of the torque developed between the rotor 22 of the motor M and the drive spindle 23. The degree of slippage or magnitude of torque to drive the spindle 23 at any selected rate of speed is determined by automatic selective functioning of the eddy current clutch unit EC and the degree of excitation of its field windings 33. Hence, the rate of speed with which the drive spindle 23 may be driven from and by the constant speed motor M is infinitely variable between zero and the maximum speed, that is to say, the constant speed of the motor due to the fact that an eddy clutch of the type of the clutch unit EC is infinitely variable in the torque delivered and transmitted by it from zero torque at negative excitation to maximum torque at maximum excitation. In accordance with our invention we provide for control automatically of the torque developed and transmitted by the clutch unit EC to maintain such developed torque at the magnitude required to maintain the rate of speed at which the drive spindle 23 is driven from the constant speed motor M at the selected and preset rate of speed under the varying operating and load conditions encountered by the drive. The eddy current clutch unit EC is selectively operated automatically when the rate of speed of the drive spindle 23 falls below the preset rate to decrease the slippage and increase the torque delivered to the drive spindle 23 to thereby bring the rate of speed of the drive spindle up to the preset rate. On the other hand, if the speed of the drive spindle 23 increases from the preset rate of speed, then the brake unit BA is automatically operated to apply braking forces to the drive spindle 23 to bring the speed of the spindle back down to the preset speed. Thus by selective and coordinated automatic functioning of the clutch unit EC and the brake unit BA to meet varying operating and load conditions imposed on the drive spindle 23, an efficient maintenance of the drive spindle at the selected preset speed is obtained. This selective and automatic coordinated functioning of the clutch unit EC and the brake unit ED is carried out in accordance with our invention by an electronic servo control system which is monitored automatically to effect the required operations of the clutch unit and the brake unit to instantly overcome and compensate for variations in operating conditions acting to change the speed of the drive spindle from the preset speed thereof for which the drive has been adjusted. An electronic servo control system of the invention for efficiently automatically selectively operating the clutch and brake units to effect precise control and maintenance of the speed of operation of the drive spindle 23 at that preset speed for which the control system is adjusted, is disclosed in Fig. 10 of the drawings and is described and explained in detail herebelow.

*Electronic servo control network*

In the adjustable, infinitely variable speed, power drive unit 10 of the invention as hereinbefore described, the motor M thereof is a ½ H.P. constant speed, three-phase, alternating current induction motor of the squirrel cage type. Referring now to Fig. 10, the motor M is supplied with 220 volt alternating current by suitable power lines L1, L2 and L3. In this instance the motor unit M includes the winding TR2 which supplies 110 volt alternating current. The windings TR3 and TR4 each supplies a 6.3 volt alternating current.

The eddy current clutch EC of the drive unit 10 is of the direct current type and includes the rectifier D1 which regenerates current obtained from decaying flux of the clutch field CA to produce an operation very similar to that of full wave clutch excitation. The rectifier D1 for clutch unit EC is connected with winding TR2 by a circuit which includes the lines L6, L7, L8, L9, L10, L11, control thyratron tube V1, line L12, clutch unit EC, and lines L5 and L4.

The electric brake EB of the drive unit 10 of this example is of the direct current type and includes the rectifier D2 which regenerates current obtained from decaying flux of the brake field BA to produce an operation very similar to that of full wave brake excitation. The rectifier D2 of the brake unit EB is in a circuit which includes lines L6, L7, L8, L16, brake control thyratron V2, brake unit EB, and lines L14 and L4.

An electronic servo control system of the invention for automatically maintaining operation of an output component or drive spindle driven by the constant speed motor M at a selected preset rate of speed is exemplified by the network of Fig. 10. The excitation and operation of the eddy current clutch unit EC is controlled by and from the thyratron tube V1 (type 6012) while the excitation and operation of the electric brake unit EB is controlled by and from the thyratron tube V2 (type 2D21). It is to be here noted that thyratron V1 (6012) is capable of handling more current than thyratron V2 (2D21). The firing of the thyratron tubes V1 and V2 is controlled by varying the bias voltages applied to the grids of these tubes and, in accordance with the system of the invention, these tubes are in a null condition and relation as to both the clutch unit EC and the brake unit EB when the output component driven by the constant speed motor M is operating precisely at the rate of speed for which the servo control system has been adjusted and preset. However, when the rate of speed of the power output component being driven by the constant speed motor M exceeds the preset rate, then automatically this system effects excitation of the brake unit EB to apply speed retarding braking forces to the output component to reduce the speed thereof to the preset speed. Similarly, when the speed of the driven or output component falls below the rate of speed for which the system has been preset, then automatically the clutch unit EC is excited by its control thyratron V1 with resulting increase of torque developed by the clutch to bring the speed of the component back up to the preset speed.

A direct current inverter amplifier tube V3 (type 12AU7) of the twin triode type, providing the triode unit T1 and the triode unit T2, is utilized to control the variable bias voltages for selectively firing the thyratrons V1 and V2 to selectively operate the clutch unit EC and the brake unit EB. This tube V3 has a gain factor of approximately ten (10) times. In the example system of the invention this amplifier tube V3 is used as a direct current cathode coupled inverter amplifier component to differentiate between the firing of the thyratron V2 for the brake unit EB and the firing of the thyratron V1 for the clutch unit EC. The selective firing of the thyratron V1 controls the excitation and therefore the operation of the eddy current clutch EC to vary the torque delivered thereby in accordance with the rate of speed of the power output component, or drive spindle 23 of this example, being driven by the motor M relative to the preset speed for which the servo control system has been adjusted. The selected firing of the thyratron V2 controls the excitation of the electric brake unit EB to apply braking or speed retarding forces to the power output component being driven by the motor M in accordance with the operating speed of the component relative to the preset speed for which the servo control system has been adjusted.

The first or right-hand triode unit T1 of the amplifier tube V3 (when facing Fig. 10) is connected to the grid of the brake unit controlling thyratron V2 by a circuit which includes lines L10 and L20, a voltage regulating gas tube V4, line L21, resistor R6, line L22, the triode unit T1, line L23, resistor R9, the grid of thyratron tube V2 and lines L16 and L9. The second or left-hand triode unit T2 (when facing Fig. 10) is connected with the grid of the clutch controlling thyratron V1 by a circuit which includes lines L10 and L20, the voltage regulating gas tube V4, line L21, resistor R6, line L24, the triode unit T2, line L25, the potentiometer P1, line L26, resistor R1, line L27, the grid of control tube V1, and line L11.

The monitoring, error or reference voltage for the grids of the triode unit T2 of the inverter amplifier tube V3 is supplied by the algebraic sum of the reference voltage by the direct current tachometer generator G which is driven directly from the output component or spindle 23 of the example power drive unit 10 of the invention, as hereinbefore described and explained and as shown particularly in Figs. 3 and 4. This D.C. tachometer generator G delivers a direct voltage proportionate to its speed and provides the controlling grid bias voltage for the twin triode amplifying tube V3 which latter tube selectively controls and determines the firing of the thyratrons V1 and V2 by supplying to the latter bias voltages to automatically and selectively control the operations of the clutch unit EC and the brake unit BA to maintain automatically the rate of speed of the output component at the preset rate for which the servo control system has been adjusted. Thus the D.C. tachometer generator G feeds back to the amplifier tube V3 with the tube V3 then supplying the right voltage to either the brake controlling thyratron V2 or the clutch controlling thyratron V1 in accordance with the rate of speed at which the output component or drive spindle 23 is operating. If the drive spindle 23 is operating at the preset or adjusted speed, then null conditions prevail in the servo control system and the clutch unit EC and brake unit EB are conditioned for that speed, but if the drive spindle 23 attempts to run over the preset speed, then the brake unit EB is caused to function to brake the speed down to the preset speed, while if the drive spindle attempts to run under the preset speed, the clutch unit EC is caused to function to increase its torque and bring the drive spindle up to the preset speed.

Following the teachings of the invention, the firing points of the clutch and brake controlling thyratrons V1 and V2 are controlled by developing a variable direct current voltage with a special saw tooth rider. The development of the wave form voltages of the variable direct current with its saw tooth rider to the compensated saw tooth rider of the invention, is graphically illustrated in Figs. 7A, 7B, 7C, 7D and 7E. With the compensated saw tooth wave form of rider of Fig. 7E, the wave has a compensated slope so that the grid voltage curve can be intersected more proportionately and thereby provide a better linear firing control of the thyratron tubes V1 and V2. The invention provides in the servo control system of Fig. 10 an electronic network for developing and applying this compensated saw tooth wave form of rider for controlling the firing of the thyratrons V1 and V2.

As a regulated voltage for reference or monitoring and for supply to the D.C. inverter amplifier V3 is desirable for speed calibration, a voltage regulating gas tube V4 (type OA3) is utilized as a constant voltage source for this purpose. This voltage regulating gas tube V4 has as a main characteristic the ability to change its voltage resistance as load is applied to it to keep the circuit at a constant value independent of the load applied to within certain limits. In order to produce the saw tooth rider in accordance with the invention, a half wave selenium rectifier R3A is used to rectify the negative half cycle so the proper charge and discharge ripple characteristics and phase relationship can be obtained to develop the compensated saw tooth rider in the form as shown in Fig. 7E.

The compensated saw tooth generating network or system in the example hereof includes the line L30 and resistor R8 connected between the line L14 and the positive side of the rectifier R3A; the line L31 from the negative side of rectifier R3A through the line L32 and the capacitor C6 to the line L10; resistors R2 and R3 in the line L33 between line L32 and the voltage regulating gas tube V4; a capacitor C7 connected across the voltage regulating tube V4 in a line L34 connected between line L10 and the line L33 at a location between resistors R2 and R3; and a capacitor C9 also connected across the voltage regulating tube V4 in a line L35 connecting line L10 and line L20 between resistor R3 and the voltage regulating tube V4. The line L32 is capacitively coupled through a capacitor C3 to a line L36 which is connected to the plate of the triode unit T2 of amplifier tube V3 through the potentiometer P1 and the line L25. Line L36 also connects with the plate of the triode unit T1 through a line L37 and a resistor R10.

A selenium rectifier R3B has its negative side coupled to the positive side of the selenium rectifier R3A and its positive side capacitively coupled to line L10 by the capacitor C12 in the line L38. A voltage regulating gas tube V5 (type OB2) is provided to supply a positive bias on the plate circuits of the triode units T1 and T2 of the inverter amplifier tube V3. Tube V5 like tube V4 has as a characteristic the ability to change its voltage resistance as load is applied to it to maintain the circuit at a constant value independent of the applied load within certain limits. This voltage regulating tube V5 is connected in a line L40 across the lines L10 and L41. The voltage regulating tube V5 furnishes a standard voltage as a result of its gas tube characteristics and this voltage maintains the supply voltage to the amplifier tube V3 as close to a constant voltage as possible so as to keep the triggering points of the clutch unit controlling thyratron V1 and the brake unit controlling thyratron V2 constant under all varying load and line voltage conditions.

A potentiometer P2 is connected in the line L36 between lines L10 and L41. The potentiometer P2 is provided for adjusting the brake unit EB and also functions as a common grid injection resistor for both the positive voltage and the compensated saw tooth rider. In addition, this potentiometer C2 is used for adjusting the firing point of the brake thyratron V2 by adjusting the D.C. bias so that the saw tooth rider is more negative than the critical grid voltage required to fire the thyratron tube V2. Attention is directed to the fact that the grid bias on the clutch controlling thyratron V1 is to be adjusted by the potentiometer P1 after the adjustment of the grid bias on the brake controlling thyratron V2 has been adjusted by the potentiometer P2 to control the firing point of the latter tube. The potentiometers P1 and P2 are, in effect, calibrating potentiometers by which the servo control system of the drive unit is adjusted and preset for perfect balance in the control system by compensating for manufacturing tolerances in the required fixed values of the electronic and other components making up the system. Resistors R13, R14 and R15 are connected across the voltage regulating tube V5 in a line L41 between line L38 and the line L36 with the line L40 connecting into the line L41 between resistors R13 and R14. A line L42 with a capacitor C11 is connected between line L10 and line L41 at a location in the latter line between the resistors R14 and R15. A capacitor C12 is also connected across the voltage regulating tube V5 in line L38 between lines L10 and L41.

The D.C. tachometer generator G which supplies the reference or monitoring bias voltage to the grids of the twin triode amplifier tube V3 is connected in a circuit which includes the line L43 between the grid of triode unit T1 and line L10. A resistor R7 is connected in line L43 between the tachometer generator G and the grid of triode unit T1. Resistors R11 and R12 are connected in the line L43 between the tachometer generator G and the line L10. A capacitor C4 is connected across the D.C. tachometer generator G in a line L44 with this line at one end being connected into line L43 between the generator G and the resistor R7 and at the opposite end being connected into a line L45 which connects into the line L43 between the resistors R11 and R12. The grid of the triode unit T2 of the amplifier tube V3 is connected with line L10 by a line L46 in which a linear potentiometer or rheostat P3 is connected. Line L45 connects to potentiometer P3 and a switch PB1 is coupled into line L45 between the point of connection of the latter line with line L44 and a line L47 which connects line L45 with line L10. A capacitor C8 is connected in line L47. The potentiometer P3 is adjustable to infinitely vary the rate of speed of the power output component or drive spindle 23 driven by the constant speed motor M to any selected preset speed proportional to the voltage generated by the D.C. tachometer generator G which is driven from the drive spindle 23. A resistor R4 and a capacitor C10 are connected across the potentiometer P3 by lines L48 and L49 which are connected between the line L10 and a line L50 connected into the line L46 between the potentiometer P3 and the grid of the triode unit T2 of the amplifier tube V3. A resistor R5 is connected in a line L51 between line L50 and the line L21 which leads through the resistor R6 to the cathodes of the triode units T1 and T2 of the amplifier tube V3.

A capacitor C1 is connected across the thyratron control tube V1 in a line L52 connected between the grid of the thyratron V1 and the line L26 at a location in the latter line between the grid of the thyratron V1 and the resistor R1. A capacitor C2 is connected across the brake controlling thyratron V2 in a line L53 between the grid of thyratron V2 and a location in the line L23 between the resistor R9 and the grid of the thyratron V2.

In the network of the servo control system of the example hereof, as above described, a saw tooth wave form is obtained with the voltage regulating gas tube V4 by using the charge and discharge characteristics of a condenser. To this end a capacitor C6 is connected across the gas tube V4 in the lines L31 and L32 between the negative side of the half-wave rectifier R3A and line L10. In this manner a regular saw tooth wave is produced in the form as graphically shown in Fig. 7C. In accordance with the invention a special saw tooth rider is developed and produced with a compensated slope in the form as graphically shown in Fig. 7E, so as to intersect the critical grid voltage curve more proportionately and thereby provide better and more precise firing control of the clutch controlling thyratron V1 and of the brake controlling thyratron V2. In the example network of the servo control system of Fig. 10, this compensated saw tooth wave form of rider is obtained by properly phase shifting the voltage and reshaping the wave through the medium of the half-wave selenium rectifier R3A in conjunction with the gas tube V4, condensers C7 and C9 and the resistors R2 and R3. The phase shifted saw tooth wave form thus produced is further modified into the resulting compensated wave form of rider of the invention as shown in Fig. 7E by adding to it a proper potential 180° out of phase in respect to the applied voltage. This is carried out by adding thereto the 6.3 alternating current voltage from the winding TR3 through the line L17 which is capacitively coupled by the capacitor C5 to the circuitry which includes the potentiometer P2, the capacitor C3 and the capacitor C5. Thus it follows that with a sine wave from the 6.3 voltage from the winding TR3 phase shifted 180° with a positive 90° lead (see Fig. 7D) added as a rider to the saw tooth ripple voltage of the wave form of Fig. 7C, the slope of the discharge curve becomes greater and more closely follows a thyratron critical voltage curve for firing proportionately the control thyratrons V1 and V2 for controlling the clutch unit EC and the brake unit EB.

The thyratrons V1 and V2 will only conduct during the positive half cycle which is 180°, while the saw tooth wave has a 360° span. Hence, by using this compensated saw tooth wave form of the invention, as shown in Fig. 7E, a relatively linear control of the fire point of the thyratrons V1 and V2 can be obtained by varying the D.C. voltage bias on the grids of these tubes. However, the peak of the saw tooth wave is not used in controlling the firing of the thyratrons V1 and V2 because, as the firing point is approached, preignition of the thyratron exists which tends to decrease the slope of the peak on the saw tooth, thereby making that region undesirable for control purposes. It is the peak-to-peak voltage which determines the desired sensitivity. In the network of the example of Fig. 10 of the example servo control system of the invention, this compensated saw tooth rider in the form and developed as above described, is coupled to the grid circuitry of the thyratrons V1 and V2 to give proportional control of the thyratrons by varying the D.C. voltage. The saw tooth circuitry is coupled to the grid of thyratron V1 through the line L26 which connects the grid circuits with the potentiometer P1, and is connected to the grid circuit of the thyratron V2 by the line L23 which connects into the plate circuit of triode unit T1 of the inverter amplifier tube V3.

As referred to hereinbefore, the linear potentiometer P3 is used to regulate and adjust the rate of speed of the power output component or drive spindle 23 driven from the motor M, proportional to the voltage, while the D.C. tachometer G driven from the drive spindle 23 of the motor unit M generates a voltage proportional to its speed. A nulling system is obtained by providing the D.C. polarity of the potentiometer P3 in opposition to the D.C. voltage delivered by the tachometer generator G. Thus with the nulling voltage across the grids of the triodes T1 and T2 of the amplifier tube V3, the amplifier is then polarity conscious and the voltages developed across the two plate load resistors P1 and R10 are in quadrature. Hence, under starting conditions of the motor M the input grid of the amplifier tube V3 is positive, thus causing greater conduction in the triode T1 which is inverted and less conductive in the triode unit T2, thereby changing the D.C. bias on the clutch controlling thyratron V1 less negative so that it is caused to fire and excite the clutch unit EC. Increased conduction in the plate circuit of the triode unit T1 tends to increase the negative bias applied on the grid of the brake controlling thyratron V2, as will be clear from the curves of the graph of Fig. 8. The D.C. tachometer generator G then generates and supplies an opposing voltage with increase of speed of generator G until a null exists or until the proper speed setting is obtained under load with the clutch unit EC partially excited. In this connection it is to be noted that the potentiometer P3 adjusts for and sets up the selected voltage which must be met by the D.C. tachometer generator G in order to set the amplifier tube V3 in its null condition.

In an electronic servo system sensitivity is a primary object because it determines the speed of response for speed correction by the system. In the electronic servo control system of this invention, as exemplified by the electronic network of Fig. 10 hereof, as hereinabove described and explained, sensitivity of the system is dependent upon the peak voltage of the saw tooth rider. With a large peak voltage for the saw tooth rider, a greater D.C. bias change is required to obtain full excitation of the clutch and brake control thyratrons V1 and V2. Hence, in order to have sensitivity in the system, the peak voltage of the saw tooth rider should be just great enough to obtain proportional control in firing the clutch and brake thyratrons V1 and V2 with a small change in D.C. bias so that full torque can be obtained from the drive unit with a small variation in error voltage on the amplifier V3, as illustrated by the curves shown and identified in the graph of Fig. 9. By referring to the curves of Fig. 9 it will be seen that with a null system of the invention an error voltage change of plus or minus 0.5 volt will excite either the clutch unit EC or the brake unit EB from zero excitation to full excitation. Thus very fast or rapid responses are obtainable with this electronic servo control system so that the system is a practical one with a closely constant output speed. The curves shown in Fig. 9 demonstrate that linear control is available on the straight portion of the curve which will generally be the operating range of the system. The greater the slope of the linear portion of the curve, the faster the unit will respond to compensate and control for speed variation.

In the adjustable, infinitely variable speed, power drive unit of the invention the constant speed motor M is coupled to the infinitely variable speed power output component or drive spindles 23 by the eddy current clutch EC which provides the necessary "slippage" under the control and domination of the electronic servo control system of the drive unit to automatically vary the torque delivered from the motor M to the output component or drive spindle 23, that is to say, varies the "slippage," so that the output component or drive spindle is driven precisely and continuously at the selected preset speed as determined by the adjustment of the potentiometer P3 of the system. Due to the fact that the eddy current clutch EC does not in turn produce a counter electromotive force when a speed of the power output component or driven spindle 23 above the preset speed is detected by the electronic servo control system, the electric brake EC unit is used to control and prevent overspeed by braking the power output component or drive spindle until the speed thereof is returned to the preset speed. In the operation of the example servo control system of the invention the D.C. tachometer generator G is the sensing or monitoring means which supplies to the amplifier tube V3 information as to whether the output component or drive spindle is operating at a higher or a lower speed than the preset speed for which the system has been adjusted by the potentiometer P3. If the speed of the drive spindle 23 or power output component goes over the preset speed, then the voltage output of the tachometer generator G is increased and this reference voltage or monitoring signal is fed to the amplifier tube V3 which in turn through the network or circuitry of Fig. 10, as hereinbefore described, effects firing of the brake control thyratron tube V2 with resulting excitation and braking operation of the brake unit EB until the speed of the output component is reduced to the preset speed, whereupon the voltage output of the tachometer generator G reduces to that required for the null condition of the system for continuation and maintenance of operation at the preset speed. If, on the other hand, the speed of the drive spindle 23 or power output component falls below the preset speed for which the servo control system of the drive unit has been adjusted, then the voltage generated by the tachometer generator G is reduced and this reference voltage or monitoring signal is fed to the amplifier tube V3 which through the electronic network of the described system causes an increase in excitation of the clutch unit EC and resulting increase of the torque delivered by the clutch unit to the power output component or drive spindle 23 until the latter reaches the preset speed. When the preset speed is reached, the voltage output from the tachometer generator G is restored to that for the null condition of the servo control system at which the preset speed is maintained with the increased excitation of the clutch unit EC stopped upon cessation of the feed back to the amplifier V3 by the tachometer generator G of the below preset speed reference or error voltage.

In the example drive unit 10 hereof, the speed setting potentiometer or rheostat P3 is controlled from the control panel 11h on the forward end of the unit housing structure by a rotary control knob 80 in the usual manner familiar in the art. A speed selecting dial 81 is provided with the rheostat or potentiometer P3 and its adjusting knob 80 being calibrated for determining from the dial 81 the rate of linear feed of the worktable W in inches per minute, as determined by the rate of speed of rotation of the drive spindle 23 translated through the feed mechanism to the worktable W. The switch PB1 which is normally closed during the operation of the drive unit 10 for selected feed control of the worktable W, is also operated from the control panel 11h by a switch operating button 82. In this connection this normally closed switch PB1 is opened for rapid traverse of the worktable W. When the switch button 82 is operated to open the switch PB1, the reference voltage circuit from the tachometer generator G is opened so that the drive spindle 23 is thereafter operated at the maximum, that is, the constant, rate of speed of operation of the motor M, for rapid traverse of the worktable W.

A motor starter 83 (see Fig. 10) is provided in the power line L1 to the motor M and a suitable actuating member 84 for the motor starter 83 is mounted on the control panel 11h at the front end of the unit for controlling the starter 83 to effect starting and stopping of the motor M (see Fig. 2).

The electronic servo control system, including the thyratron control tubes V1 and V2, the amplifier tube V3, and the voltage regulating tubes V4 and V5, together with the resistors, capacitors, and other electrical components, and the circuit wiring therefor, are assembled as a package unit on a suitable base or chassis 85 which is removably mounted as a unit assembly in the compartment 11m provided in the front housing section 11, as will be clear by reference to Figs. 2 and 3 of the drawings. Suitable circuit connections, as indicated in Fig. 10, are provided between the electrical assembly on the base 85 and the manually operable control members 80, 82 and 84 mounted on the control panel 11h. Thus by removing the front wall 11e which provides the control panel 11h, the electronic servo control system assembly or "package" may be quickly and readily removed and replaced.

It is to be further noted that with a drive unit of the invention, as exemplified by the unit 10 hereof, the factor governing the supply voltage to the field of the eddy current clutch unit EC is the combination of the load encountered by the worktable W and the particular speed setting of the control system as determined by the potentiometer or rheostat 3. The components or factors involved in the speed setting are the reference, monitoring, or error voltage as determined by the setting of the potentiometer P3, which voltage is to be matched with the voltage generated by the tachometer generator G, and the algebraic sum of these two voltages is then applied to the triode T2 of the inverter amplifier tube V3 to adjust to its circuitry the level of the rider wave with respect to the cathode grid circuit of the thyratron tube V1 to determine the exact amount of excitation of the eddy current clutch required to drive spindle 23 and in turn feed the worktable W under its load conditions at the preset speed for which the potentiometer B3 has been adjusted. During the operation of the control system of the drive unit the degrees or levels of excitation of the eddy current clutch unit EC change with load changes on the drive and there may be half wave rectification through the thyratron control tube V1 to accelerate the drive instantly to the preset speed when the speed drops below such speed. Usually the brake unit control thyratron V2 is fired full on for maximum excitation of the brake unit when the speed of the drive exceeds the preset speed.

In the drive unit 10 disclosed herein as a selected example of the invention adapted as a drive for the worktable of a milling machine, the motor M of the drive is of ½ H.P. However, it is to be understood that the invention is not limited to a motor of any particular horse power as motors of greater or lesser horse power than that of the example hereof may be used with, of course, appropriate changes in the electronic tubes and other electrical components of this system. Similarly, while the example drive unit 10 is shown as adapted for the linear feed of the worktable of a machine tool, the invention is not limited to this adaptation and use but is adapted to various other uses where a precise and fast-acting, infinitely variable speed power drive for precisely maintaining a selected and preset speed, is desired or of advantage.

It will also be evident that various other changes, modifications, eliminations, substitutions, and additions may be resorted to in both the drive and the electronic servo control system thereof, without departing from the broad spirit and scope of our invention, and hence we do not desire or intend to limit our invention in all respects to the exact and specific constructions, combinations and sub-combinations of the drive and electronic servo control system disclosures hereof, except as may be required by specific and intended limitations thereto appearing in any of the appended claims.

What we claim is:

1. An electronic control system including, in combination, a first operating current supply circuit; a second operating current supply circuit; a first thyratron control tube connected in said first operating current supply circuit; a second thyratron control tube connected in said second operating current supply circuit; a source of biasing voltage; a twin triode inverter amplifying tube; a circuit connecting said source of biasing voltage with the grids of the triodes of said inverter amplifier tube; a circuit connecting one triode of said inverter amplifier tube with the grid of said first thyratron control tube and a circuit connecting the other triode of said inverter amplifier tube with the grid of said second thyratron control tube; a voltage regulating gas tube connected across said first thyratron control tube; a voltage regulating gas tube connected across said second thyratron control tube; a saw tooth rider generating circuitry connected into said grid biasing circuits to said first and second thyratron control tubes and including a source of alternating current, a half wave rectifier, capacitance and a resistance connected across said first voltage regulating gas tube, and a phase shifting network connected with a source of alternating current for generating a compensated saw tooth rider voltage having an increased slope for the discharge curve thereof for effecting relatively linear control of the firing of said first and second thyratron control tubes; a bias voltage adjusting potentiometer connected in said biasing voltage supply circuit from said source of biasing voltage to said inverter amplifier tube; and said source of biasing voltage supplying biasing voltages having a polarity in opposition to the polarity of said potentiometer.

2. An electronic control system including, in combination, a first operating current supply circuit; a second operating current supply circuit; a first thyratron control tube in said first operating current supply circuit; a second thyratron control tube in said second operating current supply circuit; a tachometer generator for generating biasing voltages proportional to the rate of speed of operation of said tachometer generator; a twin triode inverter amplifier tube; a biasing voltage supply circuit from said tachometer generator to the grids of said twin triode inverter amplifier tube; a power supply circuit connected to said inverter amplifier tube for power current flow through said tube under the control of the grid biasing voltages supplied to said tube from said tachometer generator; operating current supply circuits connected between the triodes of said amplifier tube and the grids, respectively, of said first and second thyratron control tubes; a first voltage regulating gas tube connected across said first thyratron control tube; a second voltage regulating gas tube connected across said second thyratron control tube; a compensated saw tooth wave rider generating circuitry connected into said grid biasing circuits to said first and second thyratron control tubes for supplying thereto a compensated saw tooth wave rider having the slope of its discharge curve closely following the thyratron critical voltage curve for proportional firing of said first and second thyratron control tubes; said compensated saw tooth rider generating circuitry including resistance and capacitance connected across said first voltage regulating gas tube, a half-wave rectifier and a phase shifting network applying a sine wave voltage to the saw tooth wave voltage circuitry; a voltage adjusting potentiometer connected in said biasing voltage supplying circuit to the grids of the triodes of said inverter amplifier tube; the biasing voltages generated by said tachometer generator having a polarity in opposition to the polarity of said voltage adjusting potentiometer; and operating current supply circuits to said first and second thyratron control tubes for flow of operating current through said tubes to said first and second operating current supply circuits, respectively, upon firing of said first and second thyratron control tubes by the amplified biasing voltages supplied to the grids thereof by said inverter amplifier tube.

3. An electronic control system including, in combination, a first electrically operated component including an energizing field therefor; a second electrically operated component including an energizing field therefor; operating current supply circuits connected to the fields of said first and second electrically operated components respectively; a first thyratron control tube in said operating current supply circuit to said first electrically operated component for operating control of said component by firing of said thyratron tube; a second thyratron control tube in said operating current supply circuit to said second electrically operated component for operating control of said component of firing of said second thyratron tube; a tachometer generator for supplying biasing voltages proportional to the rate of speed of operation of said tachometer generator; a twin triode inverter amplifier tube; a biasing voltage supply circuit from said tachometer generator to the grids of said twin triode inverter amplifier tube; a current supply circuit connected to said inverter amplifier tube for amplification thereby under the control of said tube for supplying biasing voltages to the grids of said first thyratron control tube and said second thyratron control tube; a first voltage regulating gas tube connected across said first thyratron control tube; a second voltage regulating gas tube connected across said second thyratron control tube; a saw tooth wave rider generating circuitry connected into said grid biasing circuits to said first and second thyratron control tubes for supplying a saw tooth wave rider for controlling the firing of said tubes; a voltage adjusting potentiometer connected in said voltage supply circuit from said tachometer generator to the grids of the triodes of said inverter amplifier tube; and the bias voltages generated by said tachometer generator having a polarity in opposition to the polarity of said voltage adjusting potentiometer.

4. An electronic control system including, in combination, a source of alternating current; a first operating current supply circuit connected with said source of alternating current; a second operating current supply circuit connected with said source of alternating current; a tachometer generator for supplying direct current biasing voltages proportional to the rate of speed of operation of said tachometer generator; a first thyratron control tube in said first operating current supply circuit; a second thyratron control tube in said second operating current supply circuit; a twin triode inverted amplifier tube; a direct current biasing voltage supply circuit from said tachometer generator to the grids of said twin triode inverted amplifier tube; current supply circuits connected through said inverter amplifier tube to the grids, respectively, of said first and second thyratron control tubes for supplying biasing voltages thereto; a first voltage regulating gas tube connected across said inverter amplifier tube and said first thyratron control tube; a half-wave rectifier connected with said first voltage regulating tube; capacitance and resistance connected across said first voltage regulating gas tube for generating a saw tooth or ripple voltage; a phase shifting circuit for supplying a sine wave rider voltage to said saw tooth voltage generated by said first voltage regulating gas tube for forming a compensated saw tooth wave rider for controlling the firing of said first and said second thyratron control tubes; a second voltage regulating gas tube connected across said inverter amplifier tube; a biasing voltage controlling potentiometer connected in the circuit from said tachometer generator to the grids of said inverter amplifier tube for selectively setting the value of the biasing voltage to be delivered to the latter tube for controlling amplification of the biasing voltages delivered by said inverter amplifier tube to the grids of said first and second thyratron control tubes; and the polarity of the biasing voltages supplied by said tachometer generator being opposed to the polarity of said bias voltage regulating potentiometer.

5. An electronic control system including, in combination, a first operating current supply circuit; a second operating current supply circuit; a first thyratron control tube connected in said first operating current supply circuit; a second thyratron control tube connected in said second operating current supply circuit; a tachometer generator for generating biasing voltages proportional to the rate of speed of operation of said generator; a twin triode inverter amplifying tube; a biasing voltage circuit connecting said tachometer generator with the grids of said inverter amplifier tube; a current supply circuit connected through the plates of said triodes of said amplifier tube; a circuit connecting the plate circuit of the input triode of said amplifier tube with the grid of said second thyratron control tube; a circuit connecting the plate circuit of the other of said triodes of said amplifier tube with the grid of said first thyratron control tube; a plate load resistor in each plate circuit of the triodes of said amplifier tube; a first voltage regulating gas tube connected across said amplifier tube and said first thyratron control tube; capacitance and resistance connected across said first voltage regulating tube; a half-wave rectifier connected with said first voltage regulating tube to generate with said capacitance and said resistance a saw tooth wave form voltage; a phase shifting network connected with said first voltage regulating tube for applying a sine wave voltage to reform said saw tooth wave into a compensated saw tooth wave rider for controlling the firing of said first and said second thyratron control tubes; a second voltage regulating gas tube connected with said second thyratron control tube; a bias voltage adjusting and setting potentiometer connected in said circuit between said tachometer generator and the control grid of the plate circuit for said amplifier tube that is connected with the grid of said first thyratron control tube; and the polarity of the biasing voltages supplied by said tachometer generator being opposite the polarity of said bias voltage adjusting potentiometer.

6. In the electronic control system as defined by claim 5, a normally closed switch in said biasing voltage supply circuit between said tachometer generator and said bias voltage adjusting potentiometer for opening said bias voltage supply circuit.

7. In combination, a constant speed, alternating current induction motor; an eddy current clutch unit including an energizing field therefor; an electric brake unit including an energizing field therefor; said motor including a transformer winding; operating current supply circuits from said transformer winding to said fields, respectively, of said eddy current clutch unit and said brake unit; a first thyratron control tube in said operating current supply circuit to the field of said clutch unit; a second thyratron control tube in said operating current supply circuit to the field of said brake unit; a twin triode inverter amplifier tube; current supplying plate circuits to the triodes of said amplifier tube; one of said plate circuits being connected with the control grid of said first thyratron control tube and the other of said plate circuits constituting an input circuit for said amplifier tube and being connected with the control grid of said second thyratron control tube; a load resistor in each of said plate circuits from said amplifier tube; a tachometer generator for generating direct current biasing voltages proportional to the speed of operation of said tachometer generator; a biasing voltage supplying circuit connecting said tachometer generator with the grids of the triodes of said inverter amplifier tube; a network connected into said first thyratron control tube, second thyratron control tube, and said amplifier tube grid circuits for supplying thereto a saw tooth wave rider for controlling the firing of said first thyratron control tube and said second thyratron control tube; a bias voltage adjusting and setting potentiometer in said bias voltage supply circuit from said tachometer generator to the grid circuit of said amplifier tube; said tachometer generator generating biasing voltages having a polarity in opposition to the polarity of said biasing voltage adjusting potentiometer; and said biasing voltage adjusting potentiometer establishing a null condition in said circuits through said amplifier tube and said first and second thyratron control tubes to maintain said tubes extinguished when said tachometer generator is operating at a rate of speed to generate a matching voltage for which said voltage adjusting potentiometer is set.

8. An electronic control system including, in combination, a first operating current supply circuit; a second operating current supply circuit; a first thyratron control tube connected in said first operating current supply circuit for firing for flow of current therethrough; a second thyratron control tube connected in said second operating current supply circuit for firing for flow of current therethrough; a source of biasing voltage; a twin triode inverter amplifying tube; plate circuits from said triodes of said inverter amplifying tube to the grids, respectively, of said first and second thyratron control tube; a circuit connecting said source of biasing voltage with the grids of said triodes of said amplifier tube; a first voltage regulating gas tube connected across said amplifier tube between the latter and said first thyratron control tube; a second voltage regulating gas tube connected across said amplifier tube between the latter and said second thyratron control tube; a phase shifting, saw tooth wave rider generating network connected with said first voltage regulating gas tube for supplying a saw tooth rider to said first and second thyratron control tubes for linear control of the firing of said thyratron control tubes; a potentiometer constituting a load resistor in the plate circuit from said amplifier tube to said first thyratron control tube; a load resistor in said plate circuit from said amplifier tube to said second thyratron control tube; a bias voltage adjusting potentiometer connected in said circuit from said biasing voltage source to the grids of said triodes of said inverter amplifier tube for adjusting and setting the bias voltage delivered to said amplifier tube grids; and the bias voltages from said biasing voltage source having a polarity opposed to the polarity of said biasing voltage adjusting potentiometer.

9. In combination, a constant speed, alternating current induction motor; a rotary drive spindle; an eddy current clutch unit connecting said drive spindle with said constant speed motor; said eddy current clutch unit including an energizing field therefor and being operable to infinitely vary the torque developed thereby; a brake unit operable to apply braking forces to said drive spindle; said brake unit including an energizing field therefor; said motor including a transformer winding; operating current supply circuits from said transformer winding to said field of said clutch unit and to said field of said brake unit; a first thyratron control tube in said operating current supply circuit to said field of said clutch unit for firing to supply operating current to said clutch unit field; a second thyratron control tube in said operating current supply circuit to said field of said brake unit for firing to supply operating current to said brake unit field; a twin triode inverter amplifier tube; plate circuits connecting the triodes of said amplifier tube with the grids of said first and second thyratron control tubes, respectively, for supplying biasing voltages for controlling the firing of said tubes; said triodes of said amplifier tube being inverted and the input triode thereof being connected with the grid of said second thyratron control tube; a potentiometer constituting a load resistor in said plate circuit from said amplifier tube to said first thyratron control tube; a load resistor in said plate circuit from said amplifier tube to said second thyratron control tube; a tachometer generator for generating direct current biasing voltages proportional to the speed of operation of said tachometer generator; said tachometer generator being directly connected with and driven from said rotary drive spindle; a direct current biasing voltage supplying circuit connecting said tachometer generator with the grids of the triodes of said inverter amplifier tube; a first voltage regulating gas tube connected across said first thyratron control tube and including capacitance and resistance for generating therewith a saw tooth wave voltage; a circuit having capacitance therein to said first voltage regulating gas tube for applying an alternating current sine wave voltage rider to develop said saw tooth wave voltage to a compensated slope saw tooth rider; a half-wave rectifier having the negative side thereof connected into the circuitry of said first voltage regulating gas tube; a second voltage regulating gas tube connected across said second thyratron control tube; a half-wave rectifier having its positive side connected into the circuitry for said second voltage regulating gas tube and its negative side connected to the positive side of said first mentioned half-wave rectifier; a bias voltage adjusting and setting potentiometer in said direct current biasing voltage supply circuit from said tachometer generator to the grid circuits of said amplifier tube; said tachometer generator generating direct current biasing voltages having a polarity in opposition to the polarity of said biasing voltage adjusting potentiometer; said biasing voltage adjusting potentiometer establishing a null condition in said circuits through said amplifier tube and said first and second thyratron control tubes to maintain said tubes extinguished when said tachometer generator is operated by said drive spindle at a rate of speed to supply a direct current voltage to the grids of said amplifier tube matching the voltage for which said voltage adjusting potentiometer is set; and said null condition being overcome by an increase in biasing voltage generated by an increase of speed of said drive spindle to cause firing of said second thyratron control tube to effect operation of said brake unit to reduce the speed of said drive spindle and being overcome by a decrease in biasing voltage generated by a decrease in speed of said drive spindle to cause firing of said first thyratron control tube to effect operation of said eddy current clutch unit to increase the torque developed thereby to increase the speed of said drive spindle.

10. An electronic control system including, in combination, a first operating current supply circuit; a second operating current supply circuit; a first thyratron control tube connected in said first operating current supply circuit; a second thyratron control tube connected in said second operating current supply circuit; a source of direct current biasing voltage; a twin triode inverter amplifying tube; a circuit connecting said source of direct current biasing voltage with the control grids of the triodes of said inverter amplifier tube; a circuit connecting one triode of said inverter amplifier tube with the control grid of said first thyratron control tube; a circuit connecting the other triode of said inverter amplifier tube with the control grid of said second thyratron control tube; means connected into said grid biasing circuits to said first thyratron control tube and to said second thyratron control tube for generating a saw tooth wave rider; means for generating with said saw tooth rider a compensated saw tooth rider voltage having an increased slope for the discharge curve thereof for effecting relatively linear control of the firing of said first and said second thyratron control tubes; and a bias voltage adjusting potentiometer connected in said biasing voltage supply circuit from said source of biasing voltage to said inverter amplifier tube.

11. An electronic control system including, in combination, a first operating current supply circuit; a second operating current supply circuit; a first thyratron control tube in said first operating current supply circuit; a second thyratron control tube in said second operating current supply circuit; a generator formed for generating biasing voltages directly proportional to the rate of speed of operation of said generator; a twin triode inverter amplifier tube; a biasing voltage supply circuit from said generator to the control grids of said twin triode inverter amplifier tube; a power supplying plate circuit connected through the plates of said inverter amplifier tube for power current flow through said tube under the control of the grid biasing voltages supplied to said tube by said generator; operating current supply circuits between the triodes of said amplifier tube and the control grids, respectively, of said first and said second thyratron control tubes; a compensated saw tooth wave rider generating circuitry connected into said grid biasing circuits to said first and to said second thyratron control tubes for supplying thereto a compensated saw tooth wave rider having the slope of its discharge curve closely following the thyratron critical voltage curve for proportional firing of said first and said second thyratron control tubes; a phase shifting network applying a sine wave voltage to said saw tooth wave voltage circuitry; said compensated wave rider generating circuitry including means for rectifying the negative portion of said plate circuit voltage for phase shifting said wave rider and solely capacitance for further phase shifting thereof; and a voltage adjusting potentiometer connected in said biasing voltage supply circuit to the grids of the triodes of said inverter amplifier tube.

12. An electronic control system including, in combination, a first operating current supply circuit; a second operating current supply circuit; a first thyratron control tube in said first operating current supply circuit; a second thyratron control tube in said second operating current supply circuit; a direct current generator generating direct current biasing voltages proportional to the rate of speed of operation of said generator; a twin triode inverter amplifier tube; a direct current biasing voltage supply circuit from said generator to the control grids of said twin triode inverter amplifier tube; a plate circuitry connected to the plates of said inverter amplifier tube for power current flow through said inverter amplifier tube under the control of the grid biasing voltages supplied by said generator; operating current supply circuits connected between the triodes of said inverter amplifier tube and the control grids, respectively, of said first and of said second thyratron control tubes; a compensated saw tooth wave rider generating circuitry connected into said grid biasing circuits to said first and second thyratron control tubes for supplying thereto a compensated saw tooth wave rider having the slope of its discharge curve closely following the thyratron critical voltage curve for proportional firing of said first and second thyratron control tubes; a circuitry for rectifying the negative portion of the plate circuit voltage of said triodes of said inverter amplifier tube for phase shifting said wave rider; a further phase shifting circuitry including only capacitance therein to further phase shift said wave rider; a voltage adjusting potentiometer connected in said biasing voltage supplying circuit to the grids of the triodes of said inverter amplifier tube; and operating current supply circuits to said first and second thyratron control tubes for flow of operating current through said tubes to said first and second operating current supply circuits, respectively, upon firing of said first and second thyratron control tubes by the amplified biasing voltages supplied to the control grids thereof by said inverter amplifier tube.

References Cited in the file of this patent

UNITED STATES PATENTS

| | | |
|---|---|---|
| 1,760,988 | Lansing | June 3, 1930 |
| 2,042,962 | Rathbun | June 2, 1936 |
| 2,411,122 | Winther | Nov. 12, 1946 |
| 2,491,340 | Stivin | Dec. 13, 1949 |